UNITED STATES PATENT OFFICE.

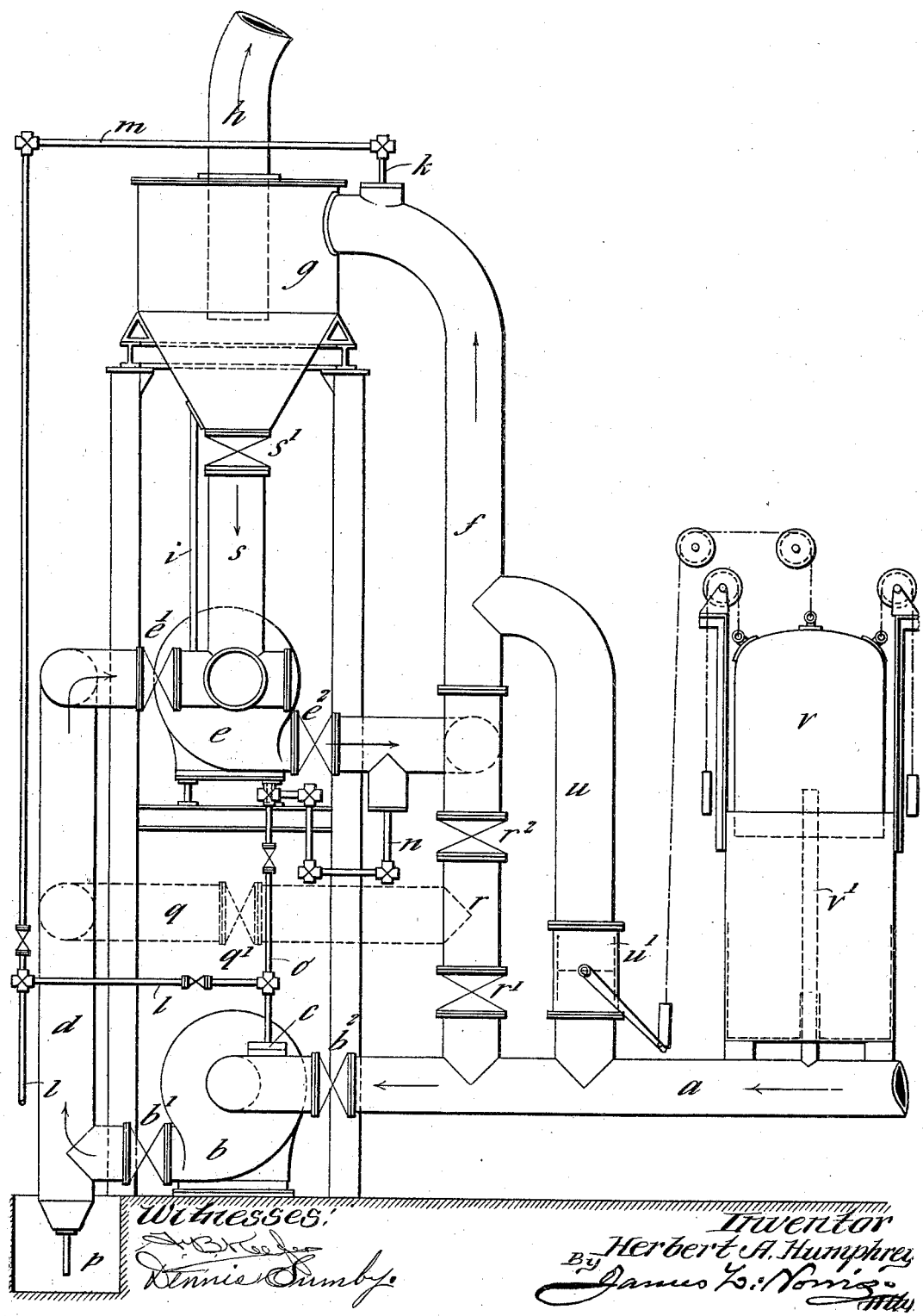

HERBERT A. HUMPHREY, OF WESTMINSTER, LONDON, ENGLAND.

APPARATUS FOR PURIFYING GAS.

SPECIFICATION forming part of Letters Patent No. 709,772, dated September 23, 1902.

Application filed May 5, 1902. Serial No. 106,038. (No model.)

*To all whom it may concern:*

Be it known that I, HERBERT ALFRED HUMPHREY, a citizen of England, residing at 38 Victoria street, Westminster, in the county of London, England, have invented a certain new and useful Apparatus for Purifying Gases, (for which I have applied for a patent in Great Britain, dated October 29, 1901, No. 21,720,) of which the following is a specification.

A method which has frequently been used for purifying gases consists in passing them through centrifugal apparatus at the inlet of which is admitted a water-spray. The water and gas are together thrown by the centrifugal action against the interior surface of the casing of the apparatus, so that they are intimately mixed and the gas is more or less efficiently purified.

By my invention I arrange two or more such centrifugal apparatus in series, so that the gas to be purified passes through them successively, and I provide a by-pass or by-passes between the suction and delivery of the centrifugal apparatus, so that by adjusting suitable valves the whole or a part of the gas may be caused to circulate more than once through one or more of the centrifugal apparatus. For finally removing from the gas the water suspended in it I prefer to pass the gas through a cyclone, such as is used for separating dust from air. In order to wash the gas systematically, I prefer to pass the water which drains from the last centrifugal apparatus into the inlet of the next preceding one, and so on throughout the series, so that the cleanest water may meet the cleanest gas and the dirtiest water the dirtiest gas.

The accompanying drawing is an elevation of apparatus constructed according to my invention.

The gas to be purified is drawn through the pipe $a$ by the suction of the centrifugal fan $b$, into the intake of which water-spray is admitted at $c$. The gas then passes through pipe $d$ into the inlet of centrifugal fan $e$, where it meets a second water-spray. From this fan it passes up pipe $f$ and enters at a tangent the cyclone $g$, meeting on its way the water-spray admitted at $k$. As the gas travels around the cyclone it deposits on the sides thereof most of its moisture and finally passes away comparatively dry through pipe $h$.

The circulation of the water is as follows: Entering at $l$ it passes by pipe $m$ to the spray $k$ and is carried by the gas into the cyclone, whence it passes by pipe $i$ into the inlet of fan $e$. From this fan it drains through the water seal $n$ and pipe $o$ into the fan $b$ at $c$, finally draining into the sump $p$.

The provision for by-passing the gas comprises the pipes $q$, $r$, and $s$ and the various valves.

When valves $q'$, $r'$, and $r^2$ are closed, the gas passes from $a$ through fan $b$ up pipe $d$ into inlet of fan $e$, where it meets gas passing down by-pass $s$. The combined gases are delivered into pipe $f$ and tangentially into cyclone $g$, whence part of the gas passes away at $h$ and part returns through $s$ to the fan $e$.

By opening valves $q'$ and $r'$ fan $b$ may be by-passed simultaneously with fan $e$, or $q'$ may be shut and $r'$ and $r^2$ opened, so that fan $b$ is by-passed through fan $e$. If either fan has to be worked separately while the other is cut off by means of its valves at inlet and outlet $b'$ and $b^2$ or $e'$ and $e^2$, respectively, then the pipe $q$ (shown dotted) serves to pass the delivery of fan $b$ into pipe $f$, the valve $r^2$ being open and $r'$ closed, or to pass the gas from $a$ direct to the suction of fan $e$, the valve $r'$ being open and $r^2$ closed.

When fan $b$ is alone being used, water may be passed to it directly through pipe $t$.

To prevent the danger of a negative pressure in the main $a$ and consequent drawing in of air, the by-pass pipe $u$ between the suction and delivery sides of the apparatus is provided with a valve $u'$, the lever of which is connected with a floating gas-bell $v$, whereof the interior is in communication by pipe $v'$ with the main $a$. If the pressure in this main falls, gas is withdrawn from the bell, which consequently sinks and opens the valve $u'$ to equalize the pressure.

It is obvious that although the apparatus herein described is expressly designed for bringing gas and liquid into contact for the purpose of purifying the gas it is equally applicable to bringing gases and liquids into contact in order to effect chemical or physical reaction between the gas and the liquid or even merely to cool the gas.

Having thus described the nature of this invention and the best means I know of carrying the same into practical effect, I claim—

1. In apparatus for purifying gases the combination of a series of centrifugal apparatus each delivering into the next succeeding it, pipes connecting the delivery and suction sides of the said centrifugal apparatus and valves in the said pipes, substantially as described.

2. In combination, a series of centrifugal apparatus for purifying gas each delivering into the next succeeding it, pipes connecting the delivery and suction sides of the said apparatus, valves in the said pipes and pipes connecting the drainage-sump of each apparatus with the intake of the apparatus next preceding it, substantially as described.

3. In combination, a series of centrifugal fans for purifying gas each delivering into the next succeeding it, a cyclone into which the last delivers, pipes connecting the delivery and suction sides of the said fans, and valves in the said pipes, substantially as described.

4. In combination, a series of centrifugal fans for purifying gas each delivering into the next succeeding it, a cyclone into which the last delivers, pipes connecting the delivery and suction sides of the said fans, valves in the said pipes, and pipes connecting the drainage-sump of each fan with the intake of the fan next preceding it, substantially as described.

In testimony whereof I have hereunto set my hand in presence of two subscribing witnesses.

H. A. HUMPHREY.

Witnesses:
GERALD L. SMITH,
EDWARD GARDNER.